US011132836B2

(12) United States Patent
Selvarajan

(10) Patent No.: US 11,132,836 B2
(45) Date of Patent: Sep. 28, 2021

(54) METHOD FOR DETERMINING REAL WORLD MEASUREMENTS FROM AN APPAREL 3D MODEL

(71) Applicant: Balamurugan Selvarajan, Bangalore (IN)

(72) Inventor: Balamurugan Selvarajan, Bangalore (IN)

(73) Assignee: vPersonalize Inc., Houston, TX (US)

( * ) Notice: Subject to any disclaimer, the term of this patent is extended or adjusted under 35 U.S.C. 154(b) by 0 days.

(21) Appl. No.: 16/856,810

(22) Filed: Apr. 23, 2020

(65) Prior Publication Data

US 2020/0250886 A1 Aug. 6, 2020

Related U.S. Application Data

(63) Continuation-in-part of application No. 15/633,533, filed on Jun. 26, 2017, now Pat. No. 10,706,636.

(51) Int. Cl.
*G06T 17/20* (2006.01)
*G06T 15/04* (2011.01)

(52) U.S. Cl.
CPC ............. *G06T 17/20* (2013.01); *G06T 15/04* (2013.01); *G06T 2210/56* (2013.01); *G06T 2215/16* (2013.01)

(58) Field of Classification Search
CPC ................. G06T 15/04; G06T 17/205; G06T 2219/2012; G06T 15/506; G06T 15/50; G06T 15/80; G06T 15/60; G06T 15/06
See application file for complete search history.

(56) References Cited

U.S. PATENT DOCUMENTS

| 6,614,431 B1 * | 9/2003 | Collodi ................... G06T 15/80 |
| | | 345/426 |
| 2015/0351477 A1 * | 12/2015 | Stahl ....................... G06F 30/00 |
| | | 700/132 |
| 2016/0209929 A1 * | 7/2016 | Trisnadi ................ G06F 3/0304 |

* cited by examiner

*Primary Examiner* — Abderrahim Merouan

(57) ABSTRACT

A system and method is provided for creating editable configurations of 3D models and for using a specific type of 2D vector, namely a straight line, to compute and display real world measurements on the 3D model. A 3D model with UV map is created corresponding to a manufacturing pattern and to scale by a Scale Factor. A 2D vector created and overlaid on the UV map of a 3D model, is used to create several virtual mesh groups outlined by the 2D vector, on the underlying 3D model. Two points on a 3D model is selected to create a 2D Vector comprising the points on the UV map corresponding to the selected points on the 3D model. The Path Length of created 2D Vector and the Real Length as Path Length*Scale Factor, are calculated.

2 Claims, 12 Drawing Sheets

METHOD FOR DETERMINING REAL WORLD MEASUREMENTS FROM AN APPAREL 3D MODEL

CROSS-REFERENCE TO RELATED APPLICATION

The present application is a Continuous-In-Part (CIP) application of the Non-provisional application with Ser. No. 15/633,533 filed on Jun. 26, 2017 at USPTO with the title, "SYSTEM AND METHOD FOR CREATING EDITABLE CONFIGURATIONS OF 3D MODEL", and the contents of which is incorporated in its entirety as reference herein.

BACKGROUND

Technical Field

The embodiments herein are generally related to display and manipulation of 3D models. The embodiments herein are particularly related to a system and method for creating editable configurations of a 3D model using 2D Vectors. The embodiments herein are more particularly related to a system and method for creating editable configurations of 3D model using 2D Vectors, providing the ability to alter individual group of meshes, when they are not part of a physical group on the 3D model.

Description of the Related Art

A 3D Model is a mathematical representation of any three-dimensional object (real or imagined) in a 3D software environment. Unlike a 2D image, 3D models can be viewed in specialized software suites from any angle, and can be scaled, rotated, or freely modified. The process of creating and shaping a 3D model is known as 3D modeling.

Typically, 3D models are used in film, gaming, shopping, and printing industries. One type of 3D model is polygonal model or meshes which is used in animation. The main components of a polygonal model include Faces (the number of geometric faces), edges and vertices.

Every 3D object has a corresponding UV map that defines a method or way of application of textures to the object. Additionally, every 3D object has one or more mesh groupings or objects that determine an individual entity on the model. There are several tools that allow the creation and editing of mesh groupings or objects. Typically, the entire group or entity is manipulated as a whole, for purpose of coloring or applying a texture.

In a scenario in which the separate areas of a 3D model need to be individually altered or colored, when those areas are not part of a group, different 3D models are created with a first mesh group and a second mesh group for different areas. However, the aforementioned process is time consuming and tedious.

Hence, there is a need for a simple system and method for 3D model display and manipulation. Further, there is a need for a system and method for creating a plurality of editable 3D models. Still further, there is a need for a system and method for creating a plurality of editable configurations of a 3D model from a plurality of 2D vectors or geometries.

The above-mentioned shortcomings, disadvantages, and problems are addressed herein and which will be understood by reading and studying the following specification.

OBJECTS OF THE EMBODIMENTS HEREIN

The primary object of the embodiments herein is to provide a system and method for creating easily editable 3D models.

Another object of the embodiments herein is to provide a system and method for manipulating specific areas of a 3D model using a plurality of 2D vectors.

Yet another object of the embodiments herein is to provide a system and method for creating a plurality of editable configurations of a 3D model from a plurality of 2D vectors.

Yet another object of the embodiments herein is to provide a system and method for creating individually alterable areas on a 3D model, without requiring those areas to be individual mesh groups or objects on the underlying 3D model.

These and other objects and advantages of the embodiments herein will become readily apparent from the following detailed description taken in conjunction with the accompanying drawings.

SUMMARY

The various embodiments herein provide a system and method for manipulating 3D models using a plurality of 2D vectors. The system and method provides a plurality of editable configurations of a 3D model using a plurality of 2D vectors.

According to an embodiment herein, the system uses 2D vectors (for example, SVG) to configure 3D models with different mesh groupings. Examples of 3D models include object file (OBJ), 3DS, FBX, and the like. With the present invention, a plurality of 3D models are created with different combinations of mesh groups dynamically without requiring multiple 3D models. Thus, the system reduces time consumption while creating multiple editable configurations of the 3D model. A set of faces on the 3D model is typically grouped into an object to create an individually editable entity on the 3D model, to which a color, image or texture is applied.

According to an embodiment herein, a method for creation editable configurations of 3D models includes creating a 2D vector outlining a plurality of geometries. Further, the 2D vector is overlaid on a UV map of a 3D model. The 2D vector is used to create a plurality of virtual mesh groups outlined by the 2D vector, on the underlying mesh group of the 3D model. At least one mesh is selected from the plurality of virtual mesh groups for editing, thereby creating a plurality of editable configurations of the 3D model.

According to an embodiment herein, the step of editing a selective area of a virtual mesh comprises performing any one of coloring operation, image rendering, and texturing operations. The step of editing selective areas of the 3D model further comprises creating dynamic grouping of faces in the 3D model, and manipulating areas of a 3D model as a virtual group of faces.

According to an embodiment herein, the method of editing a virtual mesh group for applying color transformation is replaced by applying the color transformation to the 2D vector and rasterizing the 2D vector into an image. Then the rasterized image is applied as a texture on the UV map.

According to an embodiment herein, the method further comprises computing an intersection of the geometries between the 2D Vector and the vertices of the UV map to create a new set of Vectors, to create Virtual Mesh Groups.

According to an embodiment herein, the vertices from the 2D Vector are mapped to the corresponding vertices on the UV and wherein the vertices from the 2D Vector, are further transformed from 2D to 3D space on the model using the UV's corresponding vertex in 3D space.

According to an embodiment herein, the geometries in the 2D Vector are altered, and wherein colors, fills, patterns and images are applied to the 2D Vector prior to the step of rasterization.

According to an embodiment herein, the method further comprises a process for manipulating preset areas of a 3D model as a virtual group of faces, when the preset areas of a 3D model are not an independent mesh group, but when the preset areas of a 3D model area subset of one mesh group, or subset of multiple mesh groups, or union of multiple mesh groups. The process for manipulating preset areas of a 3D model as a virtual group of faces, comprises defining geometries for grouping faces using one or more 2D Vectors; creating a Virtual Mesh Group using the 2D Vector in conjunction with the UV map of all mesh groups; and applying color or texture mapping to the specific Virtual Mesh Group.

According to an embodiment herein, the 2D Vector comprises a plurality of geometries and the plurality of geometries chosen from one of SVG, AI, DXF and EPS file types.

According to an embodiment herein, the 2D Vector's geometries are altered with any one of colors, fills, patterns and images applied prior to the step of rasterization. In another embodiment, the vertices of the 2D vector is mapped to the corresponding vertices on the UV map and the UV's corresponding vertex in 3D space is used for transforming vertices from the 2D vector to 3D space on the model. The 2D Vector is a file that defines vectors, geometries, paths and fills in 2D space, and wherein the file is any one of SVG, AI, DXF, and EPS formats.

According to an embodiment herein, the method of manipulating areas of a 3D model as a virtual group of faces, when they are not an independent mesh group, but a subset of a mesh group, or subset of multiple mesh groups, or union of multiple mesh groups, includes defining geometries for grouping faces using one or more 2D Vectors. Further, creating a Virtual Mesh Group using the 2D Vector in conjunction with the UV map of all mesh groups. The method of manipulating areas of a 3D model further includes applying color or texture mapping to the specific Virtual Mesh Group.

This invention outlines a method for computing and displaying real world measurements from a 3D model using a 2D vector in conjunction with the 3D model's UV map and its corresponding manufacturing pattern. The 3D model is created such that its UV map is a true representation of its corresponding manufacturing pattern and is to scale. By using any of the well known techniques, any point on the 3D model can be correlated to its corresponding point on the UV map. Since the UV map is a scaled representation of its corresponding manufacturing pattern, any point on the 3D space can be mapped to its corresponding 2D vector in the UV space and consequently to its corresponding points on the manufacturing pattern.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those skilled in the art from the following description of the preferred embodiment and the accompanying drawings in which.

Figure 1:
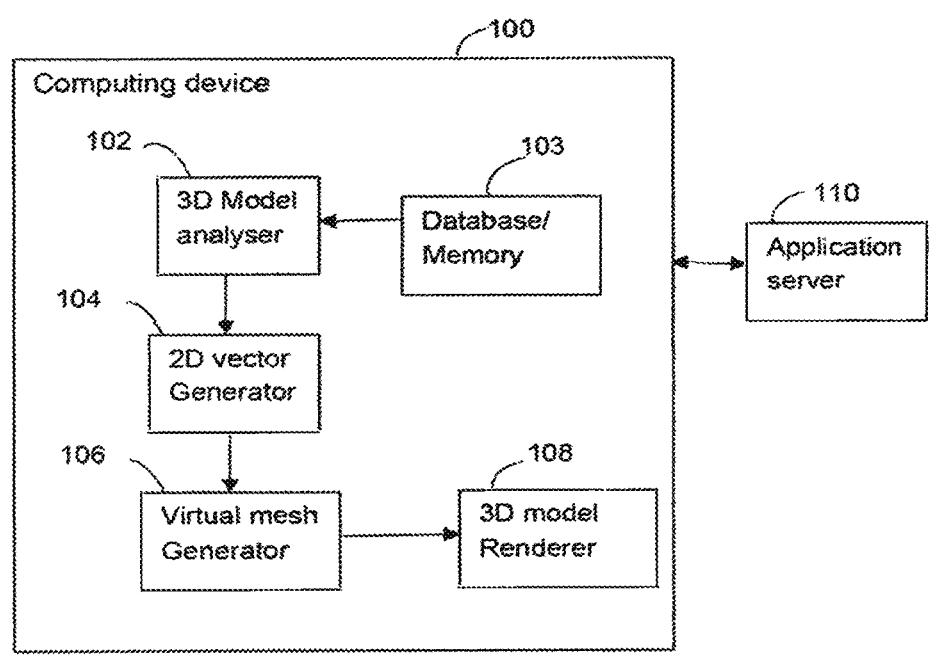
FIG. 1 illustrates a block diagram of a system for creating editable 3D models, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for manipulating 3D models using a plurality of 2D vectors. The system and method provide a plurality of editable configurations of a 3D model using a plurality of 2D vectors.

According to an embodiment herein, the system uses 2D vectors (for example, SVG) to configure 3D models with different mesh groupings. Examples of 3D models include OBJ, 3DSFBX, and the like. In one embodiment, a plurality of 3D models are created with different combinations of mesh groups dynamically without requiring multiple 3D models. Thus, the system reduces time consumption while creating multiple editable configurations of the 3D model. A set of faces on the 3D model is typically grouped into an object to create an individually manipulatable entity on the 3D model, to which a color, image or texture is applied.

According to an embodiment herein, a method for creating editable configurations of 3D models includes creating a 2D vector outlining a plurality of geometries. Further, the 2D vector is overlaid on a UV map of a 3D model. The 2D vector is used to create a plurality of virtual mesh groups outlined by the 2D vector, on the underlying mesh group of the 3D model. At least one mesh is selected from the plurality of virtual mesh groups for editing, thereby creating a plurality of editable configurations of the 3D model.

According to an embodiment herein, the step of editing a selective area of a virtual mesh comprises performing any one of coloring operation, image rendering, and texturing operations. The step of editing selective areas of the 3D model further comprises creating dynamic grouping of faces in a 3D model, and manipulating areas of a 3D model as a virtual group of faces.

According to an embodiment herein, the method of editing a virtual mesh group for applying color transformation is replaced by applying the color transformation to the 2D vector and rasterizing the 2D vector into an image. Then the rasterized image is applied as a texture on the UV map.

According to an embodiment herein, the method further comprises computing an intersection of the geometries between the 2D Vector and the vertices of the UV map to create a new set of Vectors, to create Virtual Mesh Groups.

According to an embodiment herein, the vertices from the 2D Vector are mapped to the corresponding vertices on the UV and wherein the vertices from the 2D Vector, are further transformed from 2D to 3D space on the model using the UV's corresponding vertex in 3D space.

According to an embodiment herein, the geometries in the 2D Vector are altered, and wherein colors, fills, patterns and images are applied to the 2D Vector prior to the step of rasterization.

According to an embodiment herein, the method further comprises a process for manipulating preset areas of a 3D model as a virtual group of faces, when the preset areas of a 3D model are not an independent mesh group, but when the preset areas of a 3D model are a subset of one mesh group, or subset of multiple mesh groups, or union of multiple mesh groups. The process for manipulating preset areas of a 3D model as a virtual group of faces, comprises defining geometries for grouping faces using one or more 2D Vectors; creating a Virtual Mesh Group using the 2D Vector in conjunction with the UV map of all mesh groups; and applying color or texture mapping to the specific Virtual Mesh Group.

According to an embodiment herein, the 2D Vector comprises a plurality of geometries and the plurality of geometries is chosen from one of SVG, AI, DXF and EPS file types.

According to an embodiment herein, the 2D Vector's geometries are altered with any one of colors, fills, patterns and images applied prior to the step of rasterization. In another embodiment, the vertices of the 2D vector is mapped to the corresponding vertices on the UV map and the UV's corresponding vertex in 3D space is used for transforming vertices from the 2D vector to 3D space on the model. The 2D Vector is a file that defines vectors, geometries, paths and fills in 2D space, and wherein the file is any one of SVG, AI, DXF, and EPS formats.

According to an embodiment herein, the method of manipulating areas of a 3D model as a virtual group of faces, when they are not an independent mesh group, but a subset of a mesh group, or subset of multiple mesh groups, or union of multiple mesh groups, includes defining geometries for grouping faces using one or more 2D Vectors and further creating a Virtual Mesh Group using the 2D Vector in conjunction with the UV map of all mesh groups. The method of manipulating areas of a 3D model further includes applying color or texture mapping to the specific Virtual Mesh Group.

According to an embodiment herein, the system uses 2D vectors (for example, SVG) to configure 3D models with different mesh groupings. Examples of 3D models include OBJ (object file), 3DS, FBX (filmbox) and the like. In one embodiment, a plurality of 3D models are created in different combinations of mesh groups, dynamically without requiring multiple 3D models. Thus, the system provides reduced time consumption while creating multiple editable configurations of the 3D model. A set of faces on the 3D model is typically grouped into an object to create an individually manipulatable entity on the 3D model, to which a color, image or texture is applied.

According to an embodiment herein, a method for creating editable configurations of 3D models includes creating a 2D vector outlining a plurality of geometries. Further, the 2D vector is overlaid on the UV map of a 3D model. The 2D vector is used to create a plurality of virtual mesh groups outlined by the 2D vector, on the underlying mesh group of the 3D model. Furthermore, at least one mesh is selected from the plurality of virtual mesh groups for editing, thereby creating a plurality of editable configurations of the 3D model.

According to an embodiment herein, the step of editing a selective area of a virtual mesh comprises performing any one of coloring operation, image rendering, and texturing operation. The step of editing selective areas of the 3D model further comprises creating dynamic grouping of faces in a 3D model and manipulating areas of a 3D model as a virtual group of faces.

According to an embodiment herein, the method of editing a virtual mesh group includes applying color transformation to the 2D vector and rasterizing the 2D vector into an image and further applying the image as a texture on the UV map. In another scenario, the 2D Vector's geometries are altered with any one of colors, fills, patterns and images applied prior to the step of rasterization. In yet another embodiment, the vertices of the 2D vector is mapped to the corresponding vertices on the UV map and the UV's corresponding vertex in 3D space is used for transforming vertices from the 2D vector to 3D space on the model. The 2D Vector is a file that defines vectors, geometries, paths and fills in 2D space, and wherein the file is any one of SVG, AI, DXF, and EPS formats.

According to an embodiment herein, the method of manipulating areas of a 3D model as a virtual group of faces, when they are not an independent mesh group, but a subset of a mesh group, or subset of multiple mesh groups, or union of multiple mesh groups, includes defining geometries for grouping faces using one or more 2D Vectors and further, creating a Virtual Mesh Group using the 2D Vector in conjunction with the UV map of all mesh groups. The method of manipulating areas of a 3D model further includes applying color or texture mapping to the specific Virtual Mesh Group.

In one embodiment herein, the computing device includes a 3D model analyzer configured to generate a UV map corresponding to the 3D model. The computing device includes a 2D vector generator configured to generate a 2D vector outlining paths and a polygon. The computing device includes a virtual mesh generator configured to overlay the 2D vector tan the UV map of the 3D model. The virtual mesh generator is configured to create a plurality of virtual mesh groups on a first mesh outlined by the 2D vector. The computing device includes a 3D model renderer configured to select at least one mesh from the plurality of virtual mesh groups for editing, thereby creating editable 3D model.

This invention outlines a method for computing and displaying real world measurements from a 3D model using a 2D vector in conjunction with the 3D model's UV map and its corresponding manufacturing pattern. The 3D model is created such that its UV map is a true representation of its corresponding manufacturing pattern and is to scale. By using any of the well known techniques, any point on the 3D model can be correlated to its corresponding point on the UV map. Since the UV map is a scaled representation of its corresponding manufacturing pattern, any point on the 3D space can be mapped to its corresponding 2D vector in the UV space and consequently to its corresponding points on the manufacturing pattern.

FIG. 1 illustrates a system for creating editable 3D models. The system is configured to manipulate 3D models using a plurality of 2D vectors. The system provides a plurality of editable configurations of a 3D model using a plurality of 2D vectors.

According to an embodiment herein, a system for generating editable 3D models includes a computing device installed with an application program. The computing device includes a 3D model analyzer 102 configured to retrieve a 3D model from an input source. The 3D model analyzer 102 is further configured to generate a UV map corresponding to the 3D model. The computing device includes a 2D vector generator configured to generate a 2D vector outlining paths and a polygon. In another embodiment, an existing 2D Vector is used in place of generating a 2D Vector. The computing device includes a virtual mesh generator configured to overlay the 2D vector on the UV map of the 3D model. The virtual mesh generator is configured to create a plurality of virtual mesh groups on a first mesh outlined by the 2D vector. The computing device includes a 3D model renderer configured to select at least one mesh from the plurality of virtual mesh groups for editing, thereby creating editable 3D model. The step of editing includes selecting at least one virtual mesh group for performing one of coloring, imaging, and texturing.

According to an embodiment herein, the computing device 100 is a device capable of establishing communication with other computing devices and has the capacity to render and modify the images transmitted by the application server 110. The examples of the computing device include, but are not limited to a smartphone, a laptop, a palmtop, a desktop computer, a wearable device, a personal computer, a wearable device, a smart television, a virtual reality device, and an augmented reality device. According to an embodiment herein, the tasks of the application server 110 is performed by the computing device 100, provided it has sufficient computational capacity.

According to an embodiment herein, the data is input through the computing device using an application program. The application program is selected from a group consisting of a mobile application, a web application, an application accessed through a browser, and a native application for the computing device.

According to an embodiment herein, the system further includes a hardware processor for controlling the operation of the virtual mesh generator, 3D model renderer. According to an embodiment herein, the hardware processor has the option to be upgraded and downgraded dynamically. Further, the hardware processor has multiple variations such as single-core, dual-core, multi-core, and the like.

In one embodiment, the system includes a database or memory 103 configured to store information. Typically, the database includes a variety of memory such including but not limited to a primary memory, a secondary memory, a semiconductor memory, a cache memory and the like. The database also has the option to add virtual memory for managing and upgrading the memory. The database is communicably coupled with most of the components of the application server 110 and is configured to store the information regarding the user, 3D models, 2D vectors, a plurality of identifiers, a plurality of models, population data, a plurality of base patterns and model image, a plurality of protocols used for critical operation of the application server, rules and policies for operating the system, and the like.

According to an embodiment herein, the system is implemented in a computing device with a display screen.

According to an embodiment herein, the system is implemented for design configuration involving 3D models. The applications of the system include designing apparel, footwear, interiors, furnishings, car wraps, package design, gaming and toys.

Figure 2:
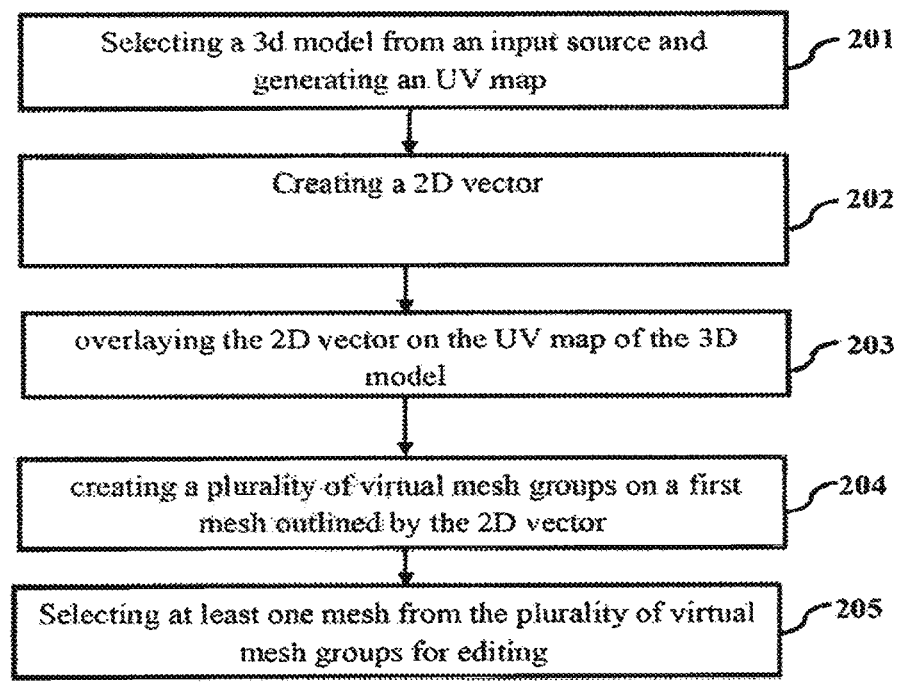
FIG. 2 illustrates a flowchart explaining a method for editing selective areas of a 3D model, according to an embodiment herein.

FIG. 2 illustrates a flowchart explaining a method for editing selective areas of a 3D model. According to an embodiment herein, a method of creating a plurality of editable 3D models includes retrieving a 3D model based on user inputs from a database or an input source, with its corresponding UV map already present or generated by the 3D model analyzer. Typically, a UV map is stored as a set of vertices in 2D space and each "face" (triangle, or a quad) in the 3D space has a corresponding map to the UV. Thereafter, a 2D vector is created by the 2D vector generator. According to an embodiment herein, an existing 2D Vector as SVG file is selected from an input source. The 2D vector outlines the paths and geometries. Further, virtual mesh groups are identified using the 2D vector in conjunction with the UV map of the 3D model by a virtual mesh generator. The 2D vector is overlaid on the UV map of the 3D model and further, an intersection of geometries between the 2D vector and the vertices of the UV map is identified to compute virtual mesh groups. Thus, a plurality of virtual mesh groups outlined by the 2D vector is identified on an underlying mesh group of the 3D model. The virtual mesh groupings are editable, colorable, and textured by a 3D model renderer. Thereafter, at least one mesh is selected from the plurality of virtual mesh groups by a 3D model renderer to create multiple editable configurations of the 3D model. A selective area on at least one virtual mesh of the 3D model is edited by the 3D model renderer.

According to an embodiment herein, the step of editing a selective area of a virtual mesh from the plurality of virtual mesh groups comprises performing any one of coloring operation, image rendering, and texturing operation. The step of editing selective areas of the 3D model further comprises creating dynamic grouping of faces in a 3D model, and manipulating areas of a 3D model as a virtual group of faces.

According to an embodiment herein, the 2D vector is rasterized into an image before applying the image as a texture on the UV map. Further, the 2D Vector's geometries are altered with any one of colors, fills, patterns and images applied prior to the step of rasterization. The vertices of the 2D vector is mapped to the corresponding vertices on the UV map and the UV's corresponding vertex in 3D space is used for transforming vertices from the 2D vector to 3D space on the model. The 2D Vector is a file that defines vectors, geometries, paths and fills in 2D space, and wherein the file is any one of SVG, AI, DXF, EPS formats.

According to an embodiment herein, the method involves a process for manipulating areas of a 3D model as a virtual group of faces, when they are not an independent mesh group, but a subset of a mesh group, or subset of multiple mesh groups, or union of multiple mesh groups. The process involves defining geometries for grouping faces using one or more 2D Vectors. Further, a Virtual Mesh Group is created using the 2D Vector in conjunction with the UV map of all mesh groups. The method of manipulating areas of a 3D model further includes applying color or texture mapping to the specific Virtual Mesh Group.

Figure 3:
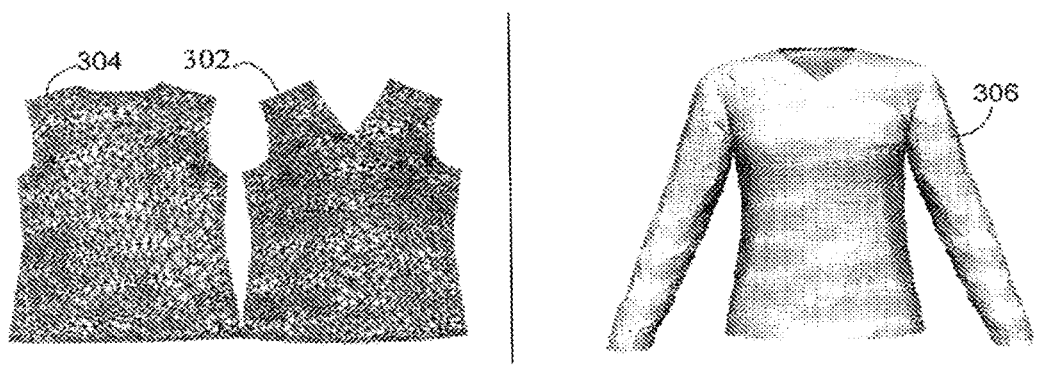
FIG. 3 illustrates a 3D model and the corresponding UV map, according to an embodiment herein.

FIG. 3 illustrates a 3D model and the corresponding UV map. In an exemplary embodiment, the 3D model 306 includes five mesh groups such as Front, Back, Left, Right and Collar. With respect to FIG. 3, a Front mesh group 302 and a Back mesh 304 groups alone are illustrated in the UV map for simplicity.

Figure 4:
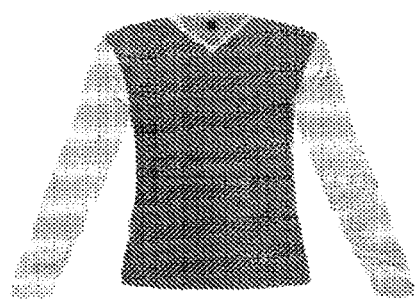
FIG. 4 illustrates the 3D model with a colour applied to the "Front" mesh group, according to an embodiment herein.

FIG. 4 illustrates the 3D model with a predefined color applied, to the "Front" mesh group. With respect to FIG. 4, the entire Front mesh group 302 is manipulated as one entity for applying colors, images or textures.

Figure 5:
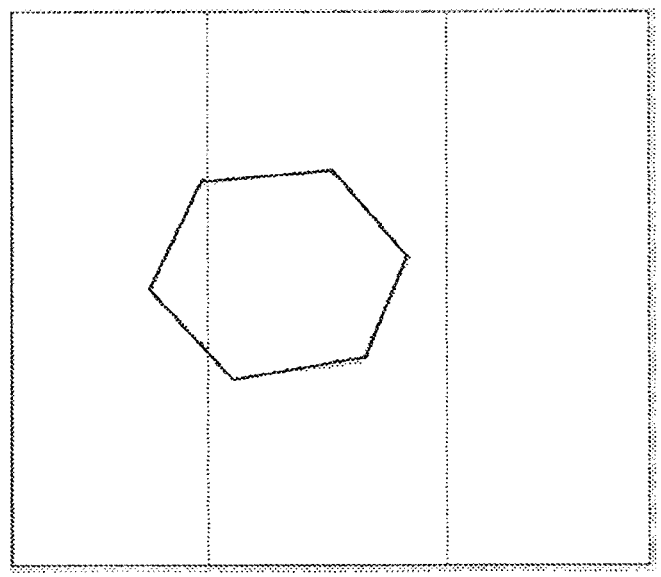
FIG. 5 illustrates an example of a 2D Vector file in SVG format, according to an embodiment herein.

FIG. 5 illustrates an example of a 2D Vector file in SVG format. With respect to FIG. 5, the 2D vector includes three rectangles and a polygon as paths. The example SVG is as follows:
<rect fill="#FFF200" stroke="#000000" width="1079" height="3500"/><rect x="1079" fill="#009444" stroke="#000000" width="1312" height="3549"/><rect x="2391" fill="#ED1C24"stroke="#000000" width="1109" height="3500"/><polygon fill="#2B2E81" stroke="#000000" points="1751,991 2187.943, 1556.193 1916.943, 2217.1931209, 2313772.057, 1747.807 1043.057, 1086, 807"/>

Figure 6:
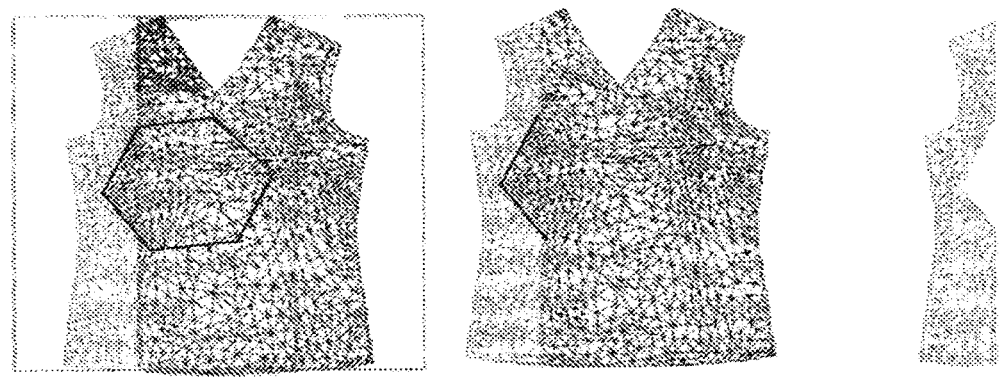
FIG. 6 illustrates the 2D Vector paths overlaid on the UV map of the front mesh group, with a Virtual Mesh Group selected, according to an embodiment herein.

FIG. 6 illustrates the 2D vector paths overlaid on the UV map of the front mesh group 302. The UV map consists of set of vertices with their coordinates and the 2D Vector defines a set of geometries. The intersection of the two geometries is mathematically calculated to identify and create virtual mesh groups. The virtual Mesh Group is dynamically created based on the 2D Vector. The Virtual Mesh Group is a transient grouping created for the convenience of editing. An exemplary selection of Virtual Mesh Group is shown in FIG. 6.

Typically, a UV map is stored as a set of vertices in 2D space and each "face" in the 3D model has a corresponding map to the UV. By mapping the vertices from the 2D Vector to the corresponding vertices on the UV and using the UV's corresponding vertex in 3D space, the 2D vector is transformed to 3D space on the model.

Figure 7:
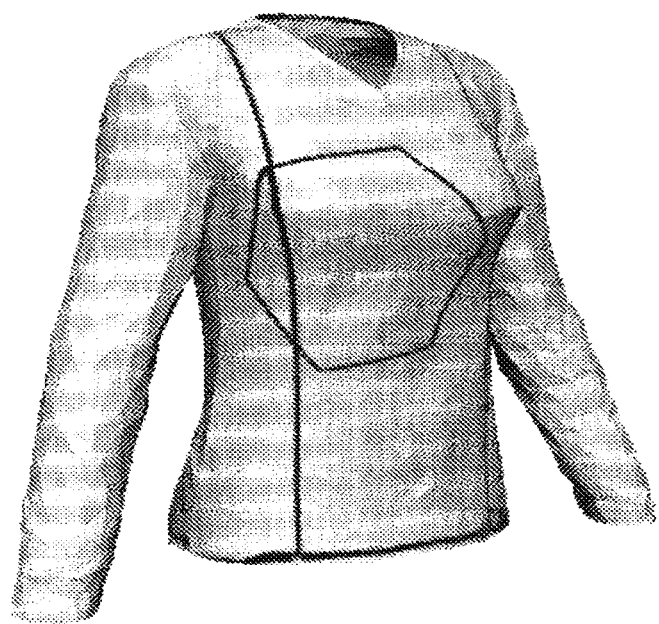
FIG. 7 illustrates the transformed 2D vector overlaid on the 3D model, according to an embodiment herein.

FIG. 7 illustrates the transformed 2D vector overlaid on the 3D model. Since the 2D vector is a set of geometries such as rectangles and paths, they can be provided with a color attribute.

Figure 8:
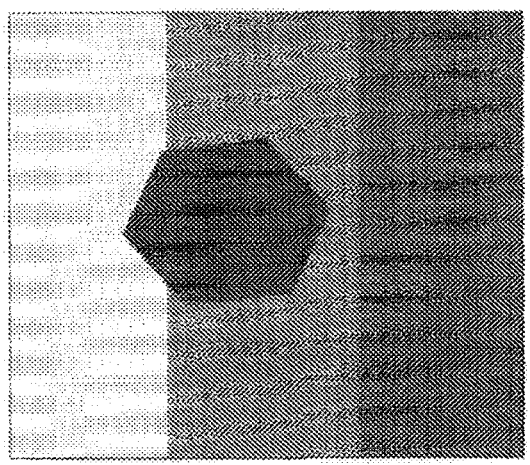
FIG. 8 illustrates the example 2D vector file with a first set of color fills applied to different geometries, according to an embodiment herein.

FIG. 8 illustrates the example 2D vector file with a first set of color fills applied to different geometries.

Figure 9:
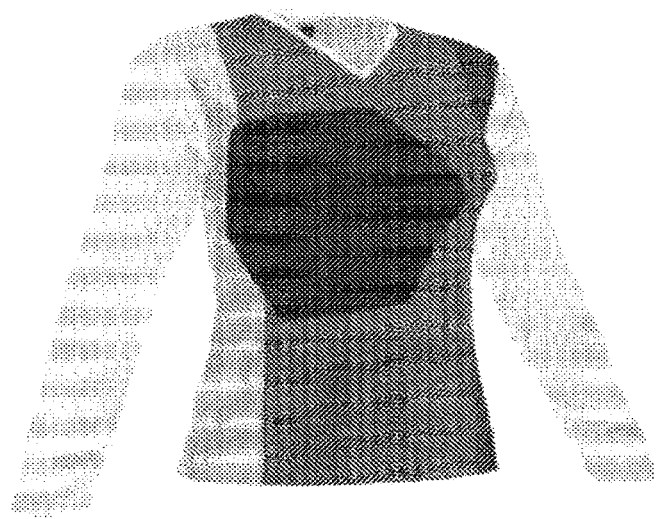
FIG. 9 illustrates the process of color transformation applied to the 3D model, according to an embodiment herein.

FIG. 9 illustrates the color transformation applied to the 3D model. In one embodiment herein, the color transformations are mapped from the 2D space to 3D space using the vector technique outlined in the system.

According to another embodiment herein, the 2D vector is simply rasterized to an image after the colors are applied and the resulting image is applied as texture to the UV map.

According to an embodiment herein, a set of colors is applied to the 2D geometries, the resulting vector is rasterized and applied to the Front. As can be seen, this has the effect of creating four Virtual Mesh Groups (Rectangle 1, Rectangle 2, Rectangle 3, Polygon 1) on the Front, making each one of them individually alterable, although front is a single entity on the model.

According to an embodiment herein, a plurality of configurations is accommodated on a single 3D model. The geometry is altered for each configuration by altering the 2D Vector or selecting another 2D Vector file without changing the original 3D model. In contrast to creating a 3D model and UV mappings, creating a 2D vector with paths and fills is simple, fast and reduces the time and effort.

Figure 10:
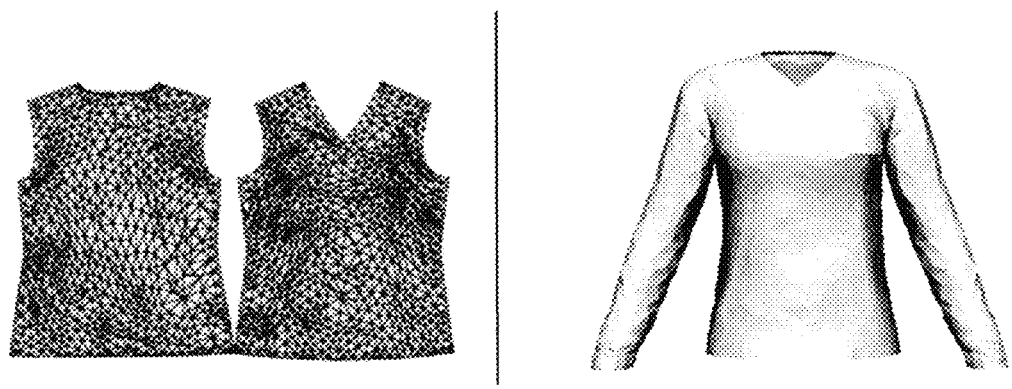
FIG. 10 illustrates a 3D model and its corresponding UV map, according to an embodiment herein.

FIG. 10 shows a 3D model and its corresponding UV map. The UV map is a true representation of its corresponding manufacturing pattern and is to scale.

Figure 11:
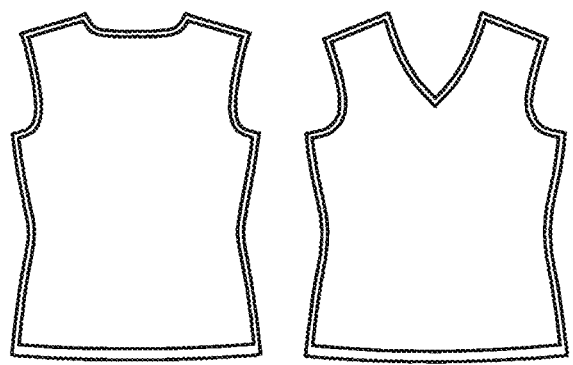
FIG. 11 illustrates a manufacturing pattern corresponding to the UV map, according to an embodiment herein.

FIG. 11 shows the manufacturing pattern which was the basis for creating the UV map. The manufacturing pattern is a CAD vector file and includes its real dimensions. Since the UV is a scaled version of its manufacturing pattern, we can know the scale factor as:

Scale Factor=Width of the manufacturing pattern for a Mesh Group/Width of UV map corresponding to the same Mesh Group. Since the scaling is uniform, the Scale Factor would be the same if we used Height instead of Width or we used any other mesh group instead of Front.

Figure 12:
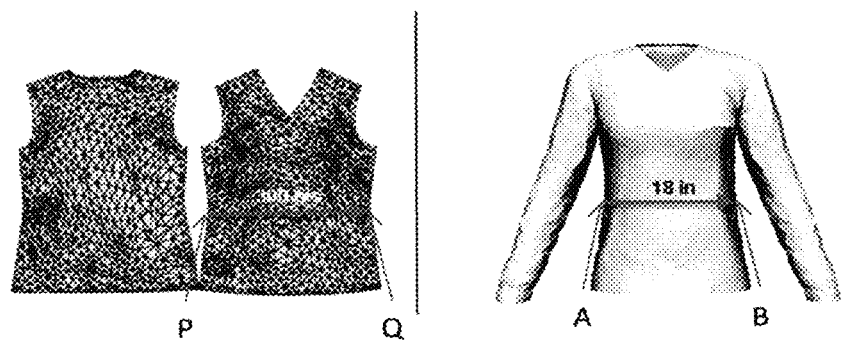
FIG. 12 illustrates a process of the path length and a real length between two points from an apparel 3D model, according to an embodiment herein.

FIG. 12 shows one embodiment of this invention. In this embodiment, two points A and B are selected on the 3D model. The two corresponding points on the UV map namely P & Q are then determined and the path length or distance between them is calculated as:

Path Length between two points $P(x1,y1)$ and $Q(x2,y2)$ is given by: $d(P, Q) = \sqrt{(x2-x1)2+(y2-y1)2}$.

Using the path length d(P,Q) and the Scale Factor, we can compute the real world length as:

Real Length is given by: $r(P,Q)=d(P,Q)*$Scale Factor

In another embodiment of this invention, a series of points can be selected on the 3D model and the real world distance can be displayed by computing the sum of the measurements for each consecutive pair of points that comprise a segment.

In yet another embodiment of this invention, an arc can be used instead of a straight line and the path distance and its corresponding real world measurement can be computed.

Most of the examples in this art illustrate selecting a subset of faces from a mesh group, but the same method is even applied for grouping faces that are a subset of multiple mesh groups and span multiple groups. The method is also applied for creating virtual mesh groupings that combine one or more underlying groups.

Advantageously, the system and method provide easy and time efficient 3D modeling. Further, the system enables to create new configurations of 3D models by simply replacing the 2D vectors instead of redesigning a new 3D model.

This invention outlines a method for computing and displaying real world measurements from a 3D model using a 2D vector in conjunction with the 3D model's UV map and its corresponding manufacturing pattern. The 3D model is created such that its UV map is a true representation of its corresponding manufacturing pattern and is to scale. By using any of the well known techniques, any point on the 3D model can be correlated to its corresponding point on the UV map. Since the UV map is a scaled representation of its corresponding manufacturing pattern, any point on the 3D space can be mapped to its corresponding 2D vector in the UV space and consequently to its corresponding points on the manufacturing pattern.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

The invention claimed is:

1. A method for creating editable configurations of apparel 3D models and determining real world measurements of the editable configurations of the 3D model comprising steps of:

Creating a 3D model with a UV map corresponding to a manufacturing pattern and to scale by 1:Scale Factor;

Creating a 2D vector outlining a plurality of geometries, wherein the 2D vector is distinct from the UV map of the 3D model;

Overlaying the 2D vector on the UV map of a 3D model;

Creating a new set of vectors by computing intersection of a plurality of geometries of the 2D vector and a plurality of vertices of the UV map, to create a plurality of new virtual mesh groups;

Selecting at least one virtual mesh group from the plurality of new virtual mesh groups;

Selecting at least two points (A, B) on the 3D model of the selected virtual mesh group;

Creating a 2D Vector comprising at least two points (P, Q) on the UV map corresponding to at least two points (A, B) on the 3D model;

Computing a Path Length of the 2D Vector, wherein the Path Length between two points $P(x1,y1)$ and $Q(x2,y2)$ is given by equation $d(P,Q)=\sqrt{(x2-x1)^2+(y2-y1)^2}$; and Calculating the Real Length between the points (A, B) as the Path Length*Scale Factor;

wherein the Scale Factor is defined as a ratio of a width of the manufacturing pattern for a Mesh Group to a width of UV map corresponding to the same Mesh Group.

2. A computer implemented method comprising instructions stored on a non-transitory storage medium and executed on a computing device comprising a hardware processor and memory, for creating editable configurations of apparel 3D models and determining real world measurements, the device comprising:

a 3D model analyzer configured to retrieve a 3D model from an input source, wherein the 3D model analyzer is further configured to generate a UV map corresponding to a manufacturing pattern and to scale by 1:Scale Factor;

a 2D vector generator configured to generate a 2D vector outlining paths and a polygon;

a virtual mesh generator configured to overlay the 2D vector on the UV map of the 3D model, wherein the virtual mesh generator is further configured to create a plurality of virtual mesh groups on a first mesh outlined by the 2D vector; and a 3D model renderer configured to select at least one mesh from the plurality of virtual mesh groups;

wherein the 3D model renderer is further configured to select at least two points (A,B) on the said 3D model, and wherein the 2D vector generator is configured to create a 2D Vector comprising at least two points (P,Q) on the UV map corresponding to the said points (A, B) on the 3D model, and wherein the 2D vector generator is configured to compute a Path Length of the said 2D Vector, and wherein the 2D vector generator is configured to calculate a Real Length as Path Length*Scale Factor, and wherein the scale factor is defined as a ratio of a height of the manufacturing pattern for a Mesh Group to a height of UV map corresponding to the same Mesh Group, and wherein the Path Length between two points $P(x1,y1)$ and $Q(x2,y2)$ is given by the equation $d(P, Q)=\sqrt{(x2-x1)^2+(y2-y1)^2}$.

* * * * *